(12) United States Patent
Commis

(10) Patent No.: US 11,345,461 B2
(45) Date of Patent: May 31, 2022

(54) WING TIP DEVICE

(71) Applicant: AIRBUS OPERATIONS LIMITED, Bristol (GB)

(72) Inventor: Ben Commis, Bristol (GB)

(73) Assignee: Airbus Operations Limited, Bristol (GB)

( * ) Notice: Subject to any disclaimer, the term of this patent is extended or adjusted under 35 U.S.C. 154(b) by 174 days.

(21) Appl. No.: 16/561,227

(22) Filed: Sep. 5, 2019

(65) Prior Publication Data

US 2020/0094940 A1 Mar. 26, 2020

(30) Foreign Application Priority Data

Sep. 21, 2018 (GB) ...................................... 1815386

(51) Int. Cl.
*B64C 5/08* (2006.01)
*B64C 23/06* (2006.01)

(52) U.S. Cl.
CPC .............. *B64C 5/08* (2013.01); *B64C 23/069* (2017.05)

(58) Field of Classification Search
CPC B64C 5/08; B64C 23/069; B64C 3/38; B64C 3/36; B64C 1/26; B64C 3/58; Y02T 50/10
See application file for complete search history.

(56) References Cited

U.S. PATENT DOCUMENTS

| 2,576,981 A * | 12/1951 | Vogt | ...................... B64C 23/069 244/91 |
| 3,231,038 A * | 1/1966 | Weiland | .................... B60V 1/22 180/120 |
| 5,102,068 A | 4/1992 | Gratzer | |
| D363,696 S * | 10/1995 | Kroo | ............................. D12/331 |
| 6,474,604 B1 | 11/2002 | Carlow | |
| 7,644,892 B1 | 1/2010 | Alford et al. | |
| 2010/0155541 A1* | 6/2010 | Garang | ................. B64C 23/065 244/199.4 |
| 2011/0024573 A1 | 2/2011 | Kirk et al. | |
| 2011/0031354 A1* | 2/2011 | Kelleher | ............... B64C 39/024 244/45 R |

(Continued)

FOREIGN PATENT DOCUMENTS

| DE | 38 00 110 | 7/1989 | |
| DE | 3800110 A1 * | 7/1989 | ............... B64C 5/08 |

(Continued)

OTHER PUBLICATIONS

European Search Report cited in 19196614.2 dated Dec. 5, 2019, 9 pages.

(Continued)

*Primary Examiner* — Medhat Badawi
*Assistant Examiner* — Vicente Rodriguez
(74) *Attorney, Agent, or Firm* — Nixon & Vanderhye P.C.

(57) ABSTRACT

A wing tip device for attaching to an aircraft wing comprising a first wing tip device element having a root end and a tip end; a second wing tip device element coupled to the tip end of the first wing tip device element; wherein the second wing tip device element has an inboard portion extending inboard from the tip end of the first wing tip device element and/or an outboard portion extending outboard from the tip end of the first wing tip device element, when viewed in the wing planform direction.

19 Claims, 7 Drawing Sheets

(56) References Cited

U.S. PATENT DOCUMENTS

| 2011/0272530 A1 | 11/2011 | Mann | |
|---|---|---|---|
| 2013/0092797 A1* | 4/2013 | Wright | B64C 3/58 |
| | | | 244/199.4 |
| 2016/0068258 A1* | 3/2016 | Seywald | B64C 23/076 |
| | | | 244/199.4 |

FOREIGN PATENT DOCUMENTS

| EP | 3296202 | 3/2018 |
|---|---|---|
| RU | 2 264 328 | 11/2005 |
| WO | 2013/007396 | 1/2013 |

OTHER PUBLICATIONS

Combined Search and Examination Report for GB Application No. 1815386.6 dated Mar. 22, 2019, 7 pages.

* cited by examiner

WING TIP DEVICE

RELATED APPLICATION

This application claims priority to United Kingdom Patent Application GB1815386.6 filed Sep. 21, 2018, the entire contents of which is incorporated by reference.

FIELD OF THE INVENTION

The present invention relates to a wing tip device, an aircraft wing including the wing tip device, an aircraft including the wing, and a method of fitting, or retro-fitting, a wing tip device to an aircraft wing.

BACKGROUND OF THE INVENTION

It is well-known that increasing the wing span of an aircraft, or including wing tip devices, such as winglets, wing tip fences and raked wing tips, that increase the effective wing span without significantly increasing the wing span, can improve aerodynamic performance, for example by controlling the development of wing tip vortices and reducing induced drag (i.e. drag due to the development of lift).

Due to twist of a wing tip device, the wing tip vortices may be located inboard of the outboard-most extent of the wing tip device. This can cause an increase in induced drag. It would be beneficial to locate the wing tip vortices as far outboard as possible with due regard to the wing span and winglet size.

SUMMARY OF THE INVENTION

According to an aspect of the invention, there is provided a wing tip device for attaching to an aircraft. The wing tip device comprising a first wing tip device element having a root end and a tip end, a second wing tip device element coupled to the tip end of the first wing tip device element, wherein the second wing tip device element has an inboard portion extending inboard from the tip end of the first wing tip device element and/or an outboard portion extending outboard from the tip end of the first wing tip device element, when viewed in the wing planform direction.

The wing planform direction is the direction normal to the plane of the wing.

By providing the second wing tip device element having the outboard portion at the tip end of the first wing tip device element, the wing tip vortices can be better controlled and induced drag can be reduced. The outboard extending portion of the second wing tip device element can move the tip vortex outboard, thereby reducing induced drag. The inboard extending portion of the second wing tip device element provides a counter-rotating lifting surface, about the tip of the first wing tip device element, which can cancel out a portion of the wing loading.

According to a second aspect of the invention, there is provided an aircraft wing comprising a wing root end and a wing tip and, and a wing tip device according to the first aspect attached to the wing tip end.

According to a third aspect of the invention, there is provided a fixed wing aircraft, comprising a wing according to the second aspect.

According to a further aspect, there is provided a method of fitting, or retro fitting, a wing tip device to an aircraft wing, the method comprising fixing a wing tip device in accordance with the first aspect of the invention to the tip end of a wing.

The wing tip device may have a first vertex between the first wing tip device element and the inboard portion of the second wing tip device element.

The wing tip device may have a second vertex between the first wing tip device element and the outboard portion of the second wing tip device element.

The second wing tip device element may be substantially planar.

The plane of the second wing tip device element may be oriented approximately normal to a cant angle of the tip end of the first wing tip device element.

The first wing tip device element includes an outboard spanwise extent, when viewed in the wing planform direction, wherein at least a trailing edge of the tip end of the first wing tip device element is inboard of the outboard spanwise extent.

The outboard portion of the second wing tip device may extend up to the outboard spanwise extent.

By extending the outboard portion up to the outboard spanwise extent, the induced drag can be reduced with little increase in tip loading and no increase in wingspan.

The first wing tip device element may be twisted between the root end of the first wing tip device element and the tip end of the first wing tip device element. The first wing tip device element may be twisted about an axis parallel to the wing planform direction so that the first wing tip device has a toe-out angle or a toe-in angle.

The wetted area of the second wing tip device element may be less than 40% of the wetted area of the first wingtip device element, and may be less than 20% of the wetted area of the first wing tip device element.

The wetted area of a device portion is the area of that device portion that is exposed to the external airflow.

The wetted area of the inboard portion may be greater than the wetted area of the outboard portion.

The second wing tip device element may extend aft, when viewed in the wing planform direction, of the tip of the first wing tip device element.

In order to maximise the reduction in induced drag, the trailing edge of the second wing tip device element may be positioned at the outboard spanwise extent of the wing tip device.

The inboard portion may have an aft swept region.

The outboard portion may have an aft swept region.

The tip end of the first wing tip device element may have a cant angle of at least 20 degrees.

The first wing tip device element may be a non-planar wing tip extension, a winglet, a winglet having a substantially planar portion and a non-planar wing tip extension, a blended winglet, a split winglet having an uplet and a downlet, a downlet, or a raked wing tip.

A non-planar wing tip extension is a tip extension that extends out of the plane of the wing to which it is attached. A winglet is a wing-like element that extends from the wing tip. A winglet may extend upwardly or downwardly from the wing tip. A winglet may be considered to be a particular example of a non-planar wing tip extension. A winglet may include a substantially planar portion joined to the wing tip by a non-planar wing tip extension portion, the non-planar wing tip extension portion having an increasing curvature of local dihedral in the outboard direction. A blended winglet is a type of winglet that included a substantially planar portion joined to the wing tip by a curved transition portion, the transition portion having a constant radius of curvature.

A raked wing tip device is a substantially planar wing tip extension which does not extend substantially out of the plane of the wing but has a higher sweep angle at the tip. A split winglet includes a wing-like lifting surface projecting upwardly (an 'uplet') from the wing, and a wing-like lifting surface projecting downwardly (a 'downlet') from the wing.

A winglet is a wing-like lifting surface projecting upwardly (an 'uplet') or downwardly (a 'downlet') from the wing. The first wing tip element may include both an uplet and a downlet, e.g. a split winglet.

The first wing tip device may include an uplet and a downlet wherein the second wingtip device element is coupled to a tip end of the uplet or downlet or a plurality of the second wing tip device elements are coupled to the uplet and downlet respectively.

A tip of the uplet and the tip of the downlet may be located at substantially the same spanwise location, when viewed in the wing planform direction.

The spanwise extent of the wing of the third aspect of the invention in the ground shape is substantially equal to an airport compatibility gate limit.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
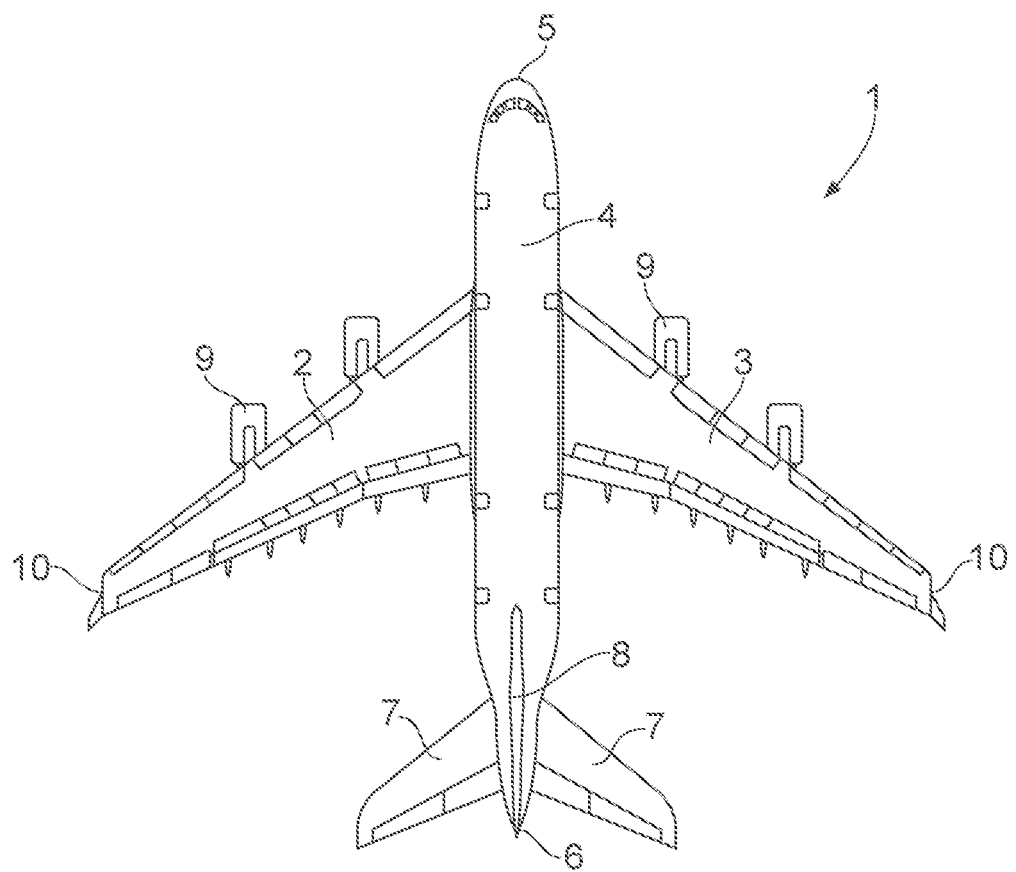
FIG. 1 is a plan view of an aircraft.
Figure 2:
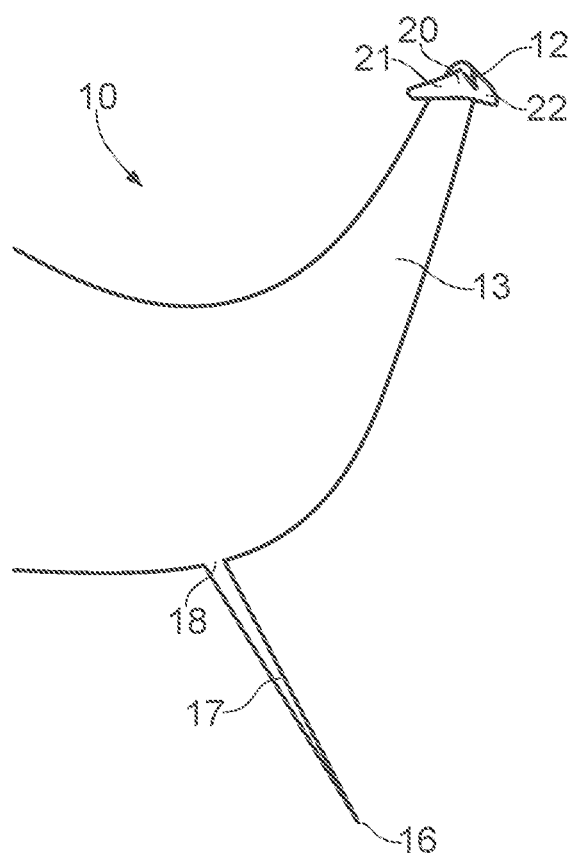
FIG. 2 shows a perspective view of a wing tip device according to a first aspect of the invention.
Figure 3:
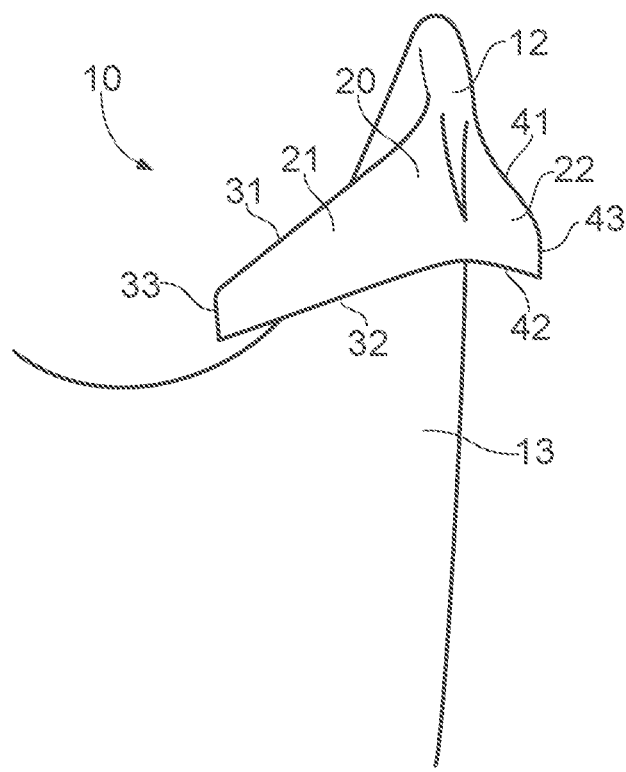
FIG. 3 shows a planform view of the second wing tip device element attached to the first wing tip device element.

FIG. 1 shows an existing aircraft 1 with port and starboard fixed wings 2,3, engines 9, a fuselage 4 with a nose end 5 and a tail end 6, the tail end 6 including horizontal and vertical stabilising surfaces 7, 8. The aircraft 1 is a typical jet passenger transonic transport aircraft but the invention is applicable to a wide variety of fixed wing aircraft types, including commercial, military, passenger, cargo, jet, propeller, general aviation, etc. with any number of engines attached to the wings or fuselage.

Each wing 2, 3 of the aircraft 1 has a cantilevered structure with a length extending in a spanwise direction from a root to a tip, the root being joined to the aircraft fuselage 4. At the tip end of each wing 2, 3 is a wing tip device 10 outboard of a main wing portion of the wing 3. The wings 2, 3 are aft swept and have a number of flight control surfaces.

As the wings 2, 3 are similar in construction, only the wing tip device 10 of the starboard wing 3 will be described in detail with reference to FIGS. 2 to 5.

The wing tip device 10 includes an upwardly extending winglet 13 extending between a root end 11, attached to a main wing portion of a wing 3, and a tip end 12 of the upwardly extended winglet 13. The wing tip device 10 is a split winglet, such that a downwardly extending winglet 17, extending from a root end 18 to a tip end 16, is attached to the upwardly extending winglet between the root end 11 of the upwardly extending winglet 13 and a tip end 12 of the upwardly extending winglet 13.

In order to increase the effectiveness of the wing tip device, for example by controlling the development of wing tip vortices and reducing induced drag without significantly increasing the wing span, a second wing tip device element 20, which in this embodiment is similar in shape to a wing tip fence, is attached to the tip 12 of the first wing tip device element 13.

The second wing tip device element 20 has an inboard portion 21 extending inboard from the tip end 12 of the first wing tip device 13. The inboard portion 21 has a leading edge 31, a trailing edge 32, and an inboard extent 33 between leading edge 31 and the trailing edge 32.

The second wing tip device element 20 has an outboard portion 22 extending outboard from the tip end 12 of the first wing tip device element 13. The outboard portion 22 has a leading edge 41, a trailing edge 42, and an outboard extent 43 between the leading edge 41 and the trailing 42.

In the example shown in FIGS. 2 to 5, the inboard extent 33 and outboard extent 43 are planar sides of the second wing tip device element 20. Alternatively the leading edge 31 and trailing edge 32 of the inboard portion 21 may meet to form a cusp, or smoothly contoured projection that forms the inboard extent, and the leading edge 41 and trailing edge 42 of the outboard portion 22 may meet to form a cusp, or smoothly contoured projection that forms the outboard extent.

The leading edge 31 and trailing edge 32 of the inboard portion 21, and leading edge 41 and trailing edge 42 of the outboard portion 22 are each swept aft relative to the longitudinal direction of the aircraft. The aircraft longitudinal direction is the direction along an axis between the nose end and tail end of the aircraft fuselage.

The leading edge 31 of the inboard portion has a sweep angle of approximately 35 degrees, although may preferably have a sweep angle between 20 degrees and 60 degrees. The leading edge 41 of the outboard portion has a sweep angle of approximately 60 degrees, although may preferably have a sweep angle of between 30 degrees and 50 degrees. The leading edges 31, 41 may be straight or curved.

The sweep angle of the trailing edges 32, 42 of the inboard and outboard portions 21, 22 are less than the respective sweep angles of the leading edges 31, 41, such that the chord length of the inboard portion decreases as it extends inboard from the tip end 12 of the first wing tip device 13, and the chord length of the outboard portion decreases as it extends outboard from the tip end 12 of the first wing tip device 13. The trailing edges 32, 42 meet at a juncture aft of the tip end 12 of the first wing tip device 13. The juncture is smoothly contoured although alternatively the trailing edges 31, 41 could meet to form a vertex.

The tip end 12 of the first wing tip device element 13 projects upwardly, with respect to the plane of the wing 3, above the second wing tip device 20 and is contoured into the upper aerodynamic surfaces 37,47 of the inboard and outboard portions 21,22. The leading edge of the first wing tip device element 13 is located forward of the leading edges 31, 41 of the second wing tip device element 20.

The wetted area of the inboard portion 21 is approximately 3 times greater than the wetted area of the outboard portion 22, and is preferably between 0.7 and 5 times greater than the wetted area of the outboard portion 22.

Figure 4:
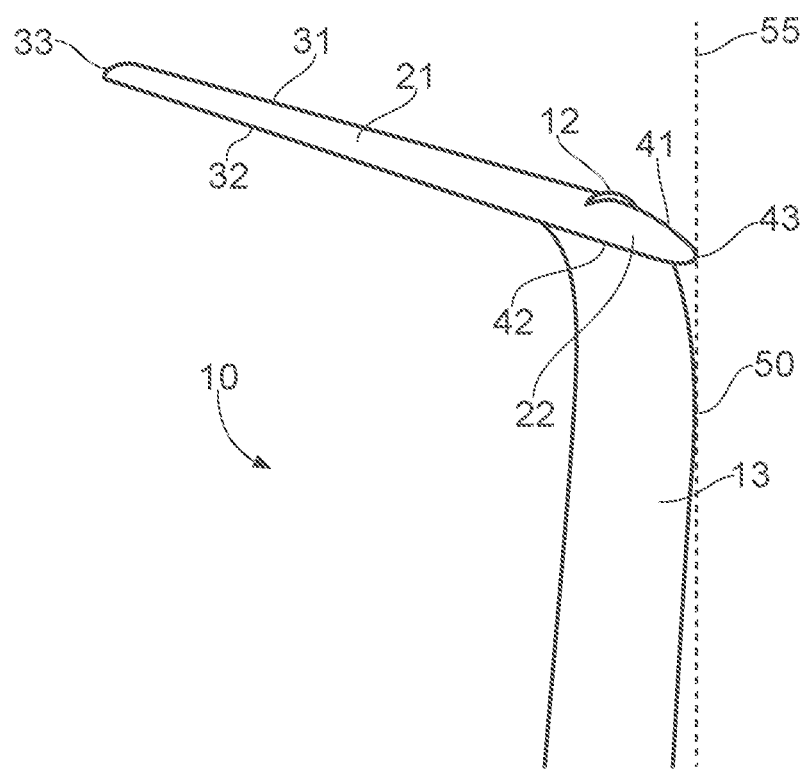
FIG. 4 shows a perspective view of the second wing tip device element attached to the first wing tip device element, wherein the perspective view is from a point of view forward of the first and second wing tip device elements and looking aft.

The first wing tip device element twists from its root end 11 to its tip end 12, such that the tip end 12 of the first wing tip device 13 is inboard of an outboard spanwise extent 50 of the first wing tip device element 13 shown in FIG. 4. As a result, the outboard extent 43 of the outboard portion 22 can be extended up to the spanwise location of the outboard spanwise extent 50 of the first wing tip device element 13, without increasing the spanwise extent 55 of the wing 3.

Figure 5:
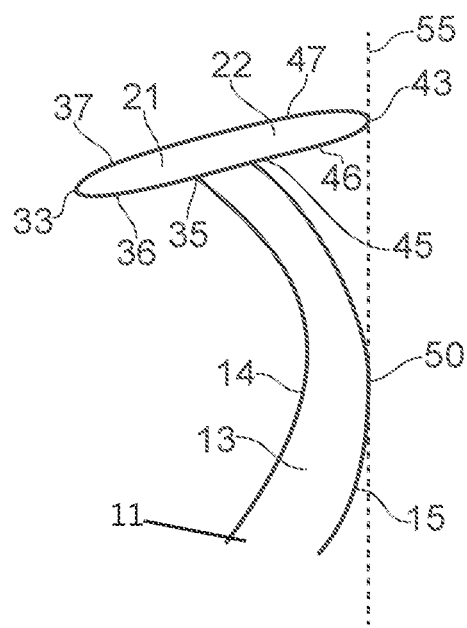
FIG. 5 shows a view along the longitudinal axis of the wing tip device according to the first example, wherein the view is from a point of view forward of the first and second wing tip device elements and looking aft.

As shown in FIG. 5, the inboard portion 21 and first wing tip device element 13 define a first vertex 35 between the lower aerodynamic surface 36 of the inboard portion 21 and the upper aerodynamic surface 14 of the first wing tip device element 13. A second vertex 45 is defined between the outboard portion 22 and the first wing tip device element 13, between the lower aerodynamic surface 46 of the outboard portion 22 and the lower aerodynamic surface 15 of the first wing tip device element 13.

Figure 6:
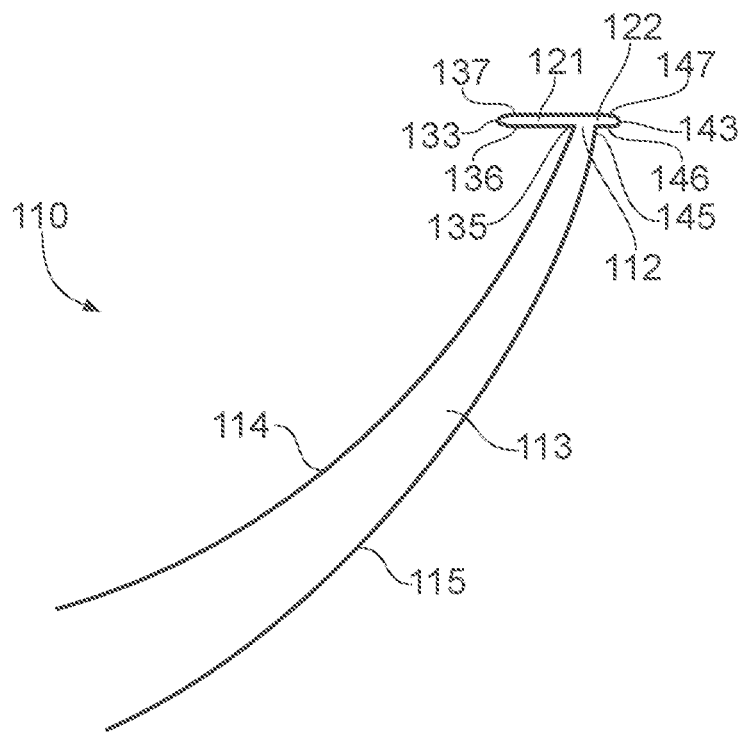
FIG. 6 shows a second example of the wing tip device.

A second example is shown in FIG. 6, in which the first wing tip device element 13 is not twisted. Similar reference numerals are used to denote similar parts but numbered in the 100 series.

The first wing tip device 110 has an inboard portion 121 with an inboard extent 133, and a first vertex 135 defined between the lower aerodynamic surface 136 of the inboard portion 121 and the upper aerodynamic surface 114 of the first wing tip device element 113. The first wing tip device 110 has an outboard portion 122 with an outboard extent 143, and a second vertex 145 defined between the lower aerodynamic surface 146 of the outboard portion 122 and the lower aerodynamic surface 115 of the first wing tip device element 113. In this example, the tip end 112 of the first wing tip device element 113 is the outermost spanwise extent of the first wing tip device element 113, such that the spanwise extent 55 of the wing is outboard of the first wing tip device element 113 and at the outboard extent 143 of the outboard portion 122.

Figure 7:
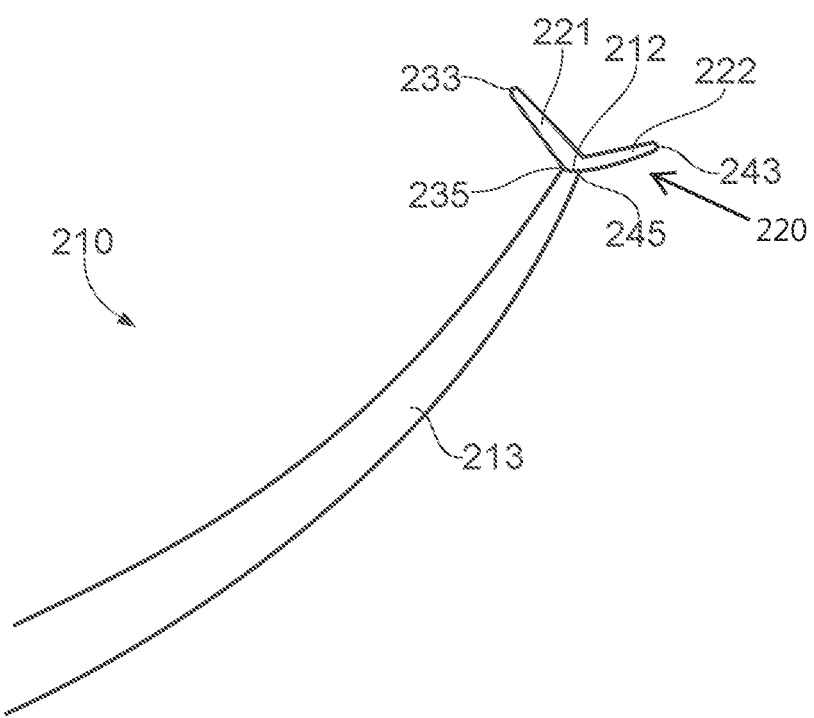
FIG. 7 shows a third example of the wing tip device.

FIG. 7 shows a third example in which similar reference numerals are used to denote similar parts but numbered in the 200 series.

In this third example, the second wing tip device element 220 is not planar and the first vertex 235 and second vertex 245 have angles of approximately 120 degrees, such that the first vertex 235 and the second vertex 245 are not complementary angles.

Figure 8:
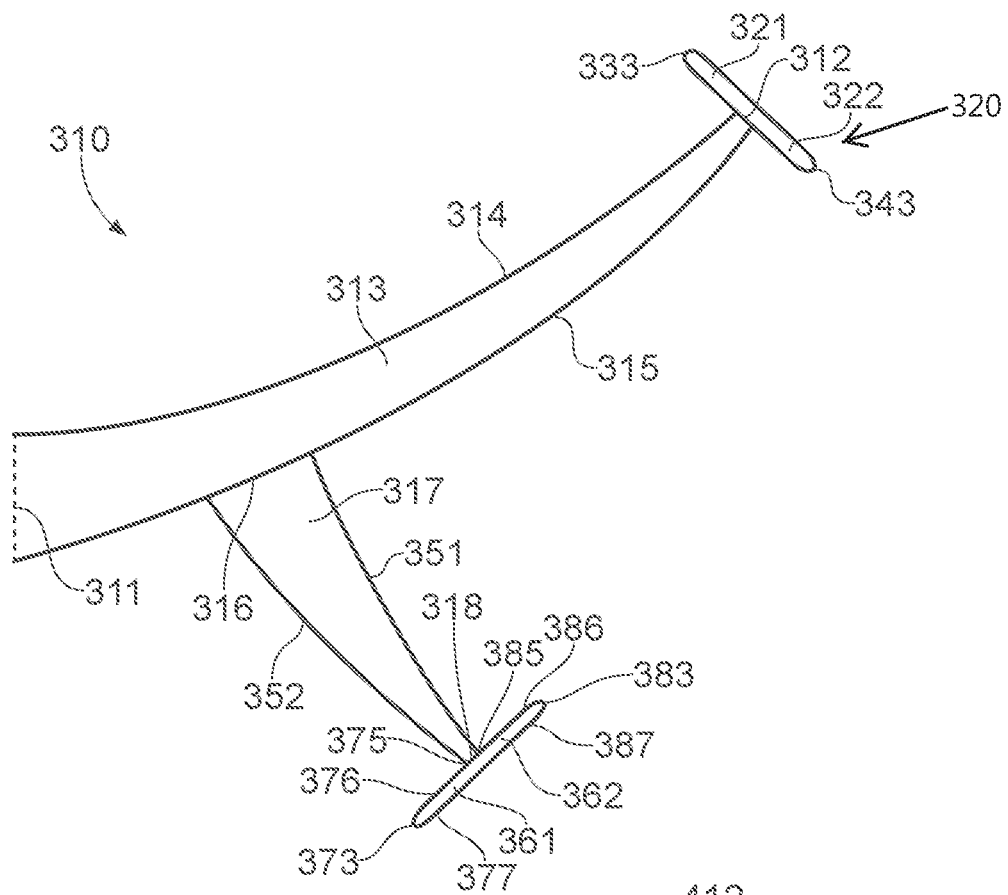
FIG. 8 shows a fourth example of the wing tip device, including a two second wing tip device elements coupled to respective uplets and downlets of a split winglet.

In a fourth example shown in FIG. 8 similar reference numerals are used to denote similar parts but numbered in the 300 series.

The first wing tip device element includes an uplet 313 attached to a wing at a root end 311, and a downlet 317 attached at a root end 316 between the root end 311 of the uplet 313 and tip end 312 of the uplet 313. A second wing tip device element 320, having an inboard portion 321 and an outboard portion 322, is attached to the tip end 312 of the uplet 313.

The second wing tip device 320 is substantially the same as in previous examples, having an inboard portion 321 with an inboard extent 333, and an outboard portion 322 with an outboard extent 343. A first vertex 335 is defined between the lower aerodynamic surface 336 of the inboard portion 321 and the upper aerodynamic surface 314 of the uplet 313, and a second vertex 345 is defined between the lower aerodynamic surface 346 of the outboard portion 322 and the lower aerodynamic surface 315 of the uplet 313.

A second wing tip device element 360 is also coupled to the tip end 318 of the downlet 317 of the first wing tip device element 310. The additional second wing tip device element 360 is substantially the same as in previous examples, having an inboard portion 361 extending inboard from the tip end 318 of the downlet 317, and an outboard portion 362 extending outboard from the tip end 318 of the downlet of the first wing tip device element. The first vertex 375 is defined between the lower aerodynamic surface 352 of the downlet 317 and the lower aerodynamic surface 376 of the inboard portion 361 of the second wing tip device element 360, and the second vertex 385 is defined between the upper aerodynamic surface 351 of the downlet 317 and the lower aerodynamic surface 386 of the outboard portion 362 of the second wing tip device element 360.

Figure 9:
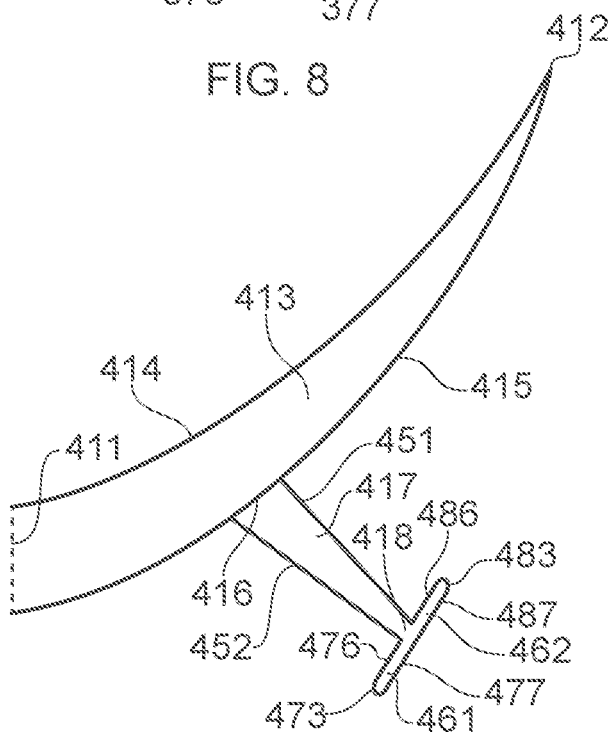
FIG. 9 shows a fifth example of the wing tip device, showing the second wing tip device element coupled to the downlet of a split winglet.

FIG. 9 shows a fifth example of the wing tip device 10 in which similar reference numerals are used to denote similar parts but numbered in the 400 series.

In this fifth example, the first wing tip device element is a split wing tip having an uplet 413 and downlet 417 as in the fourth example, however the wing tip device 410 only includes one second wing tip device element, which is attached to the tip end 418 of the downlet 417. The second wing tip device element 460 has an inboard portion 461 extending from the tip end 418 of the downlet 417 to an inboard extent 473, and an outboard portion 462 extending from the tip end 418 of the downlet 417 to an outboard extent 483. The inboard portion 461 has an upper aerodynamic surface 477 a lower aerodynamic surface 476 and a first vertex 475 defined between the lower aerodynamic surface 476 of the inboard portion 461 and the lower aerodynamic surface 452 of the downlet 417. The outboard portion 462 has an upper aerodynamic surface 487, a lower aerodynamic surface 486, and a second vertex 485 defined between the lower aerodynamic surface 486 of the outboard portion 462 and the upper aerodynamic surface 451 of the downlet 417.

Figure 10:
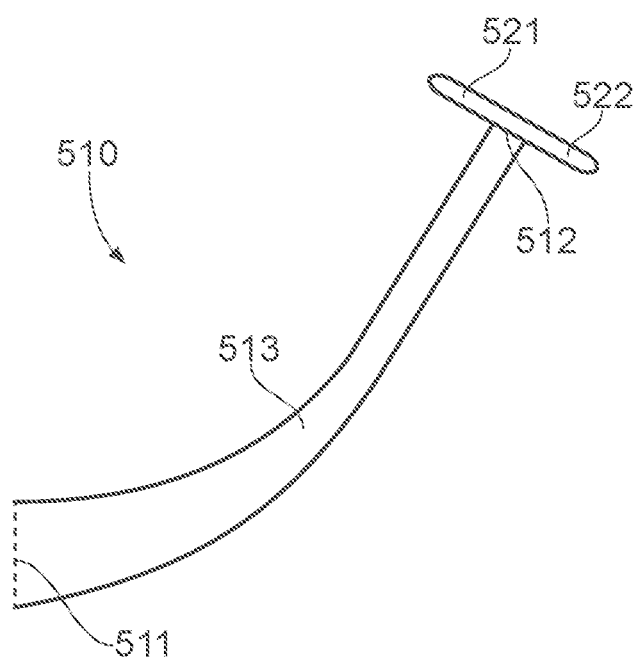
FIG. 10 shows a sixth example of the wing tip device that is a winglet having a substantially planar portion and a non-planar wing tip extension.

FIG. 10 shows a sixth example of the wing tip device 10 in which similar reference numerals are used to denote similar parts but numbered in the 500 series.

In this sixth example, the first wing tip device element 513 is a winglet having a substantially planar portion attached to a non-planar wing tip extension. The first wing tip device element 513 has a second wing tip device element attached to the tip end 512 of the first wing tip device element. The second wing tip device element has an inboard portion 521 and an outboard portion 522, as in previous examples.

Figure 11:
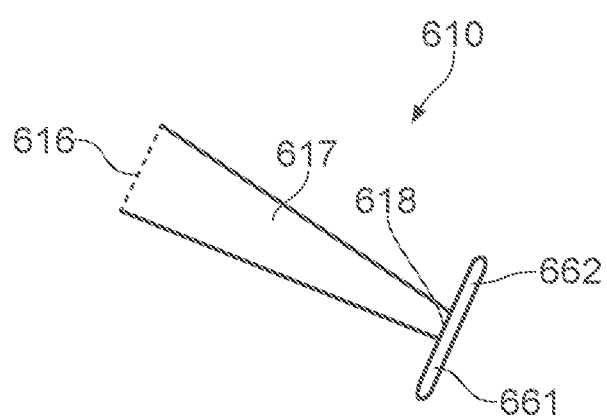
FIG. 11 shows a seventh example of a wing tip device that is a downlet.

FIG. 11 shows a seventh example of the wing tip device 10 in which similar reference numerals are used to denote similar parts but numbered in the 600 series.

In this seventh example, the wing tip device 613 is a downlet for attaching to the uplet of a split winglet. The first wing tip device element 613 has an inboard portion 621 and an outboard portion 622, as in previous examples.

Figure 12:
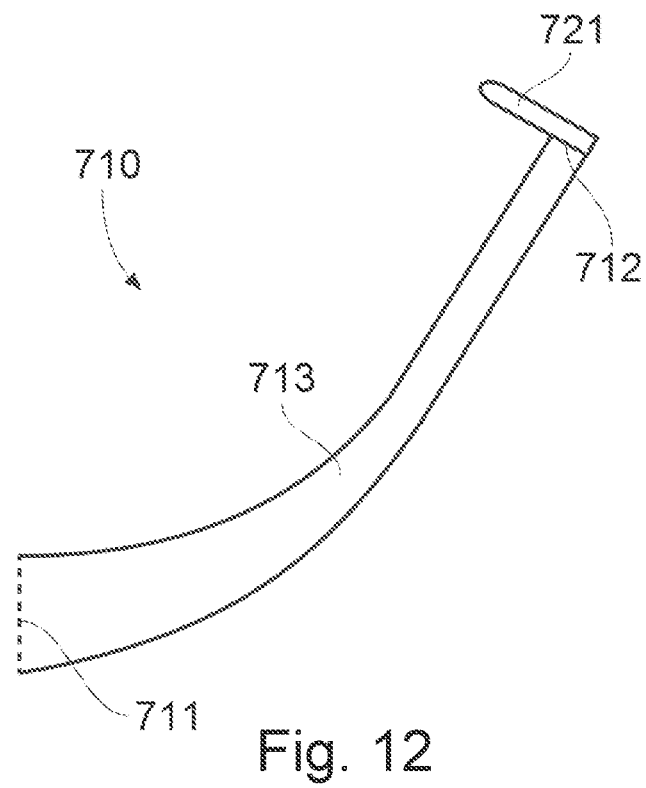
FIG. 12 shows an eighth example of a wing tip device, having a second wing tip device element having only an inboard portion.

FIG. 12 shows an eighth example of the wing tip device 10 in which similar reference numerals are used to denote similar parts but numbered in the 700 series.

In this eighth example, the first wing tip device element 713 is a winglet having a substantially planar portion attached to a non-planar wing tip extension. The first wing tip device element 713 has a the second wing tip device element with only an inboard portion 721 attached to the tip end 712 of the first wing tip device element 713. The inboard portion 721 functions similarly to inboard portions described in relation to previous examples, and it will be clear to the skilled person that the second wing tip device could be appropriately combined with many other types of first wing tip device elements, such as those mentioned in the previous examples.

Figure 13:
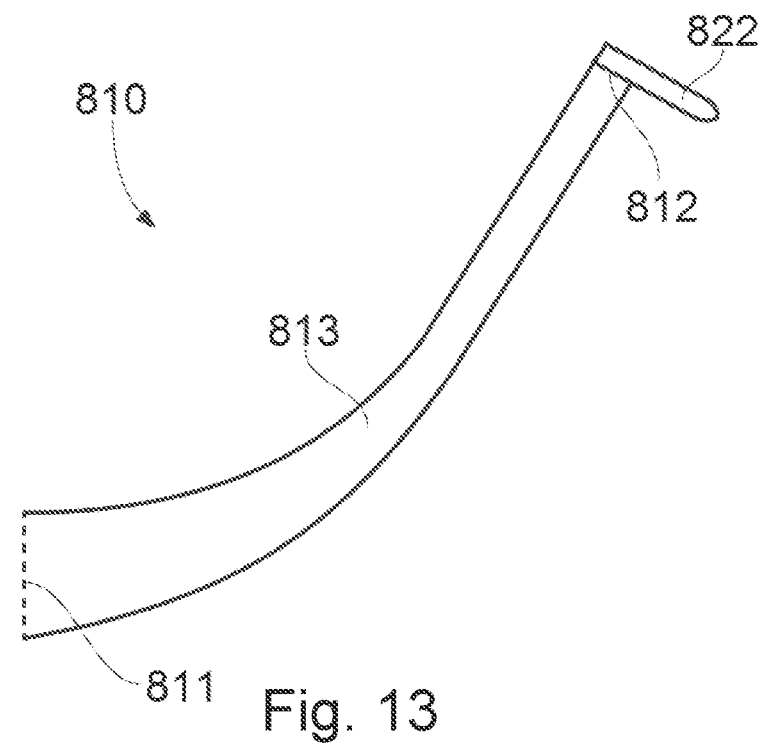
FIG. 13 shows a ninth example of a wing tip device, having a second wing tip device element having only an outboard portion.

FIG. 13 shows a ninth example of the wing tip device 10 in which similar reference numerals are used to denote similar parts but numbered in the 800 series.

In this ninth example, the second wing tip device element of the wing tip device 810 only has an outboard portion 822 attached to the tip end 812 of the first wing tip device element 813. The outboard portion 822 functions similarly to outboard portions described in relation to previous examples, and it will be clear to the skilled person that the second wing tip device could be appropriately combined with many other types of first wing tip device elements, such as those mentioned in the previous examples.

It will be clear to the skilled person that many of the features described in relation to each example can be appropriately combined with the features of other examples.

For instance, FIGS. 2 to 5 show an example in which the first wing tip device is twisted, although any of the described examples may include a twisted first wing tip device element.

FIG. 7 shows an example in which the second wing tip device element 220 is not planar, such that the inboard portion 221 and outboard portion 222 do not form a complimentary angle. It will be understood that this may appropriately apply to any of the other examples.

The wing tip devices described in each of the above examples may be fitted, or retro-fitted, to the outboard end of an aircraft wing having either no wing tip device (in the case of 'fitting') or as a replacement for an existing wing tip device (in the case of 'retro-fitting'). In some cases it will be clear that the wing tip device may be fitted, or retro-fitted, to another wing tip device, for instance in the case of a downlet fitted to the lower aerodynamic surface of an uplet.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A wing tip device for attaching to an aircraft wing comprising:
   a first wing tip device element having a root end and a tip end;
   a second wing tip device element coupled to the tip end of the first wing tip device element;
   wherein the second wing tip device element has an inboard portion extending inboard from the tip end of the first wing tip device element and an outboard portion extending outboard from the tip end of the first wing tip device element, when viewed in a wing planform direction;
   wherein the first wing tip device element includes a trailing edge portion of the tip end of the first wing tip device element inboard of another portion of the first wing tip device element which is at an outermost spanwise extent of the first wing tip device element when viewed in the wing planform direction, and
   wherein the outboard portion of the second wing tip device element extends up to the outermost spanwise extent of the first wing tip device element.

2. The wing tip device according to claim 1, wherein the wing tip device has a first vertex between the first wing tip device element and the inboard portion of the second wing tip device element.

3. The wing tip device according to claim 1, wherein the wing tip device has a second vertex between the first wing tip device element and the outboard portion of the second wing tip device element.

4. The wing tip device according to claim 1, wherein the second wing tip device element is substantially planar.

5. The wing tip device according to claim 4, wherein the plane of the second wing tip device element is normal to a cant angle at the tip end of the first wing tip device element.

6. The wing tip device according to claim 1, wherein the first wing tip device element is twisted between the root end of the first wing tip device element and the tip end of the first wing tip device element.

7. The wing tip device according to claim 1, wherein the first wing tip device element is twisted about an axis parallel to the wing planform direction so that the first wing tip device has a toe-out angle.

8. The wing tip device according to claim 1, wherein a wetted area of the second wing tip device element is less than 40% of the wetted area of the first wing tip device element.

9. The wing tip device according to claim 1, wherein a wetted area of the inboard portion is greater than a wetted area of the outboard portion.

10. The wing tip device according to claim 1, wherein the second wing tip device element extends aft, when viewed in the wing planform direction, of the tip of the first wing tip device element.

11. The wing tip device according to claim 1, wherein the outboard portion has an aft swept region.

12. The wing tip device according to claim 1, wherein the inboard portion has an aft swept region.

13. The wing tip device according to claim 1, wherein the tip end of the first wing tip device element has a cant angle of at least 20 degrees.

14. The wing tip device according to claim 1, wherein the first wing tip device element is at least one of a non-planar wing tip extension, a winglet, a winglet having a substantially planar portion and a non-planar wing tip extension, a blended winglet, a split winglet having an uplet and a downlet, a downlet, and a raked wingtip.

15. The wing tip device according to claim 1, wherein the first wing tip device element includes an uplet and a downlet, and
   wherein the second wing tip device element is coupled to a tip end of the uplet or downlet.

16. The wing tip device according to claim 15, wherein a tip of the uplet and a tip of the downlet are located at substantially the same spanwise location, when viewed in the wing planform direction.

17. The aircraft wing comprising a wing root end and a wing tip end, and the wing tip device according to claim 1 attached to the wing tip end.

18. A fixed wing aircraft comprising the aircraft wing according to claim 17.

19. The fixed wing aircraft according to claim 18, wherein the spanwise extent of the wing in the ground shape conforms to an airport compatibility gate limit.

\* \* \* \* \*